United States Patent Office 3,071,150
Patented Jan. 1, 1963

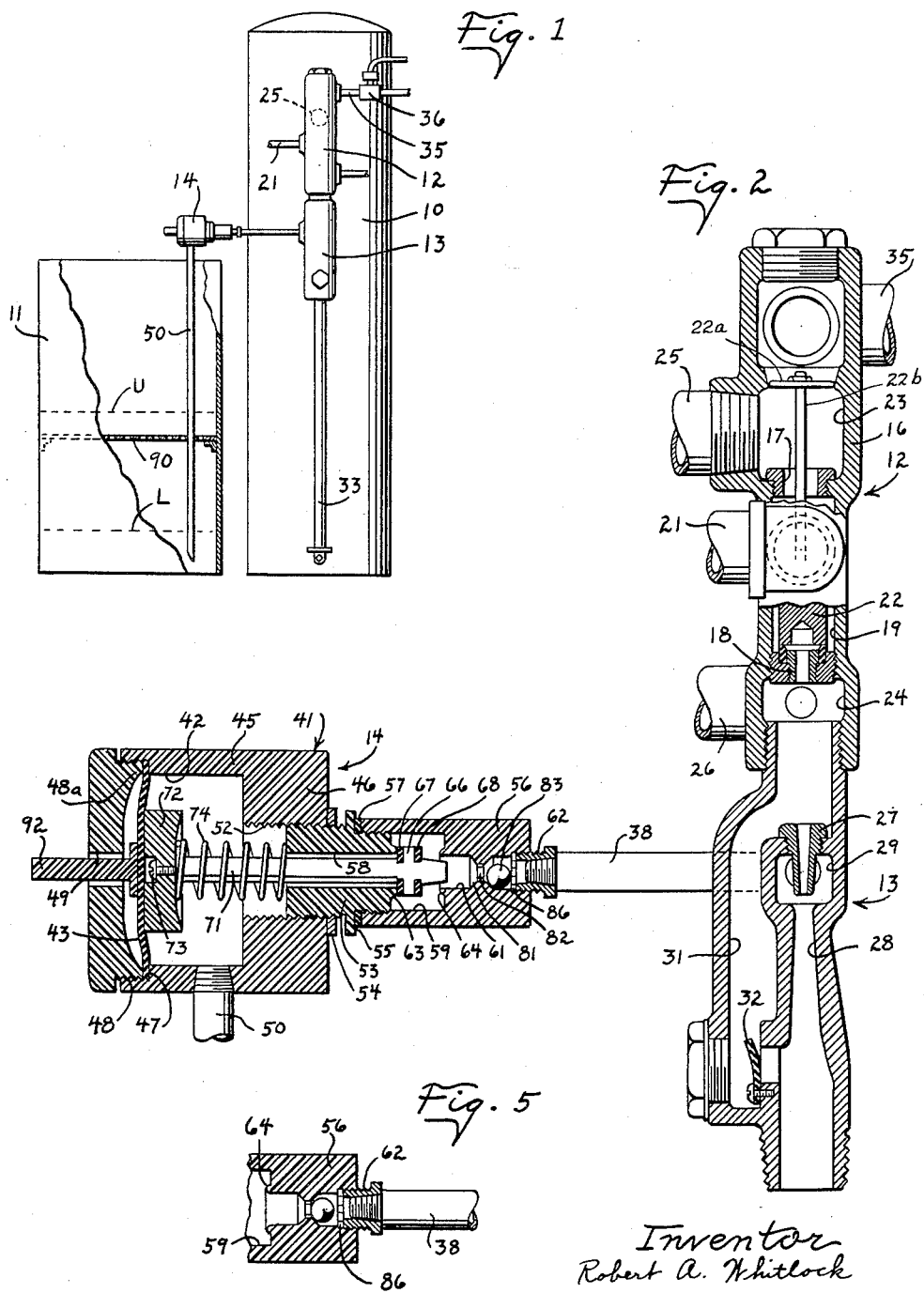

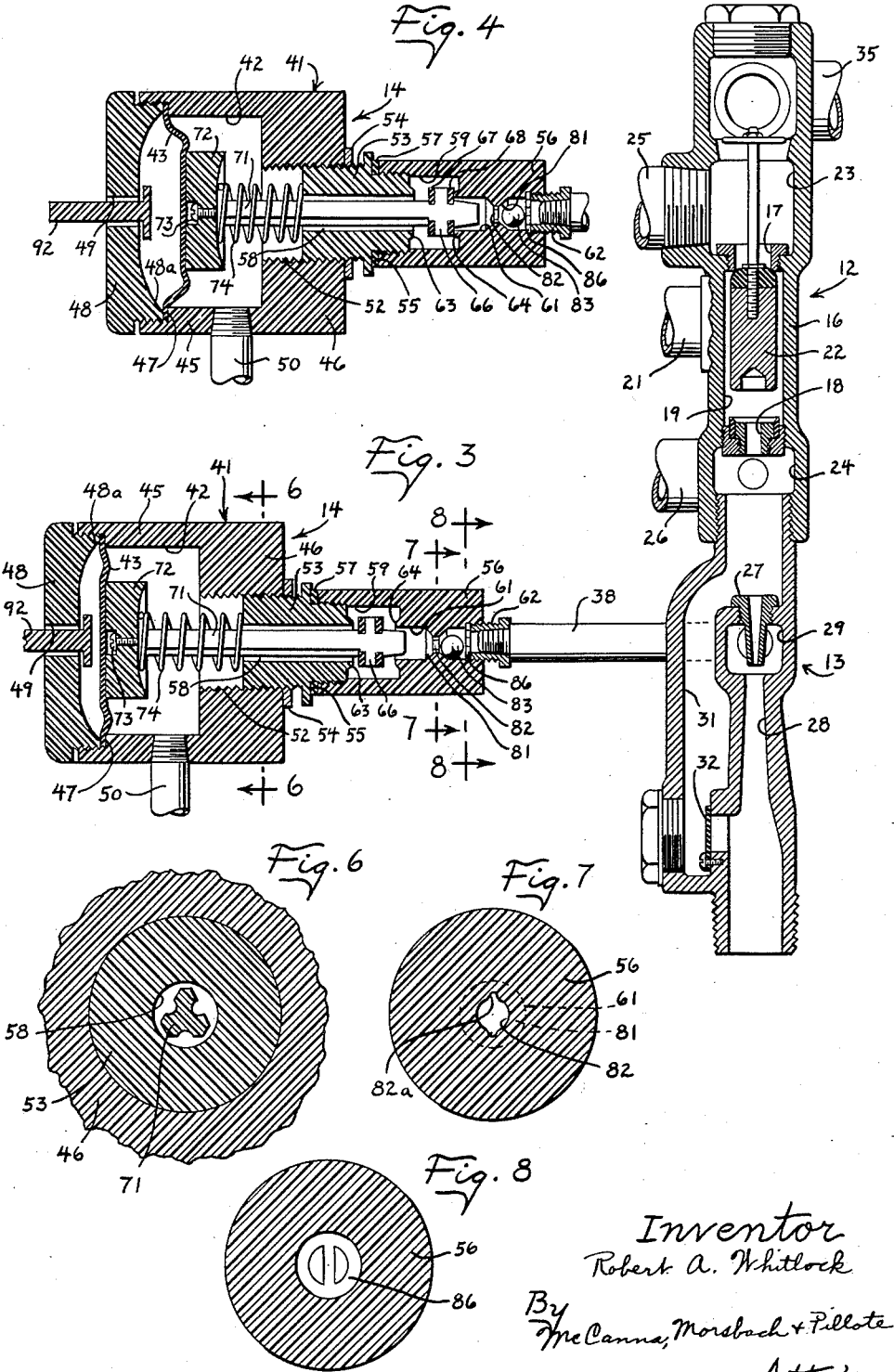

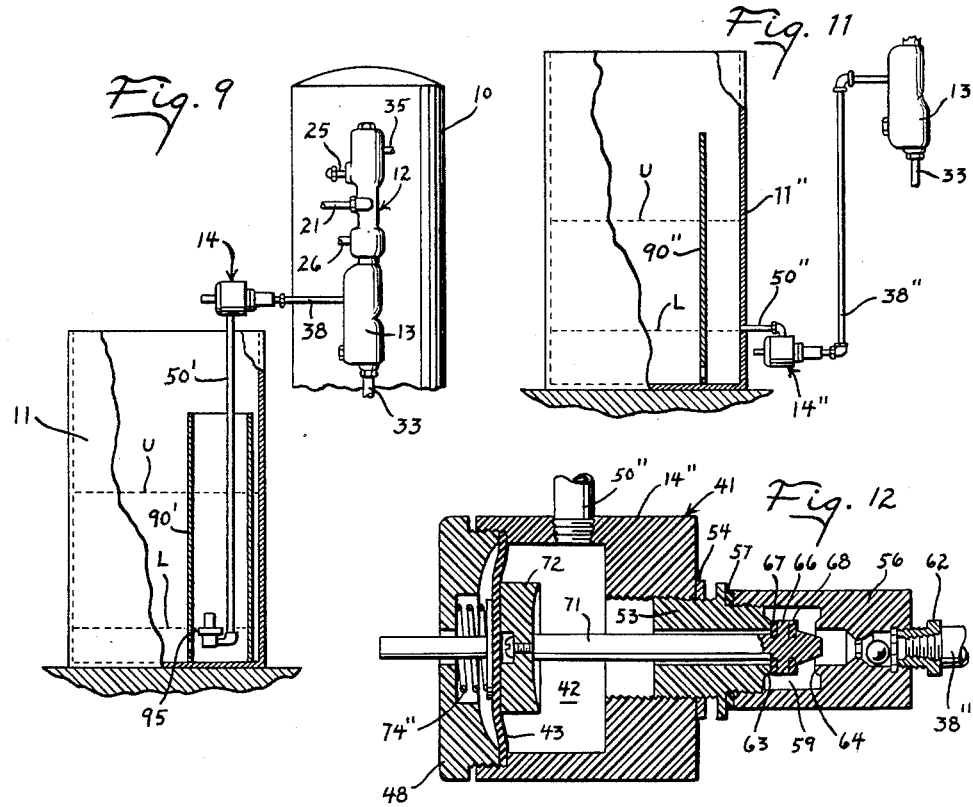
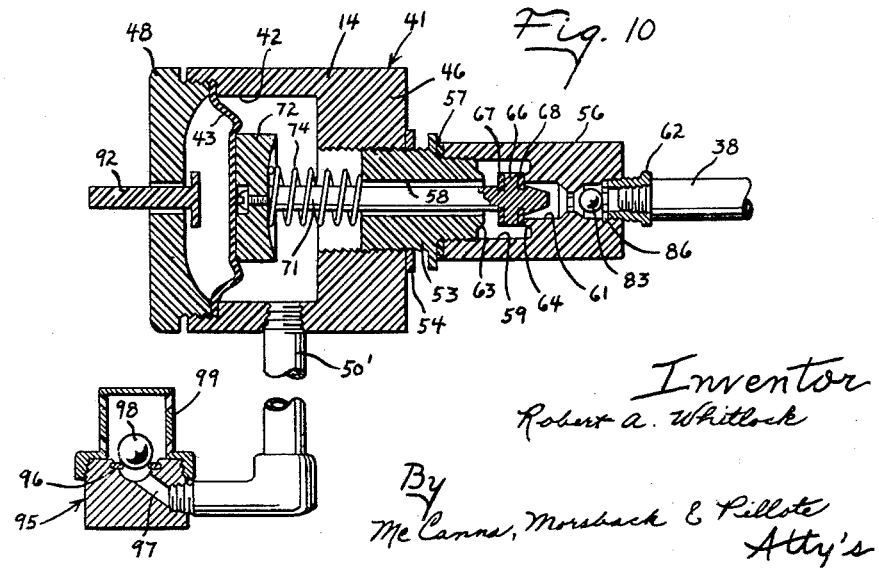

3,071,150
LIQUID LEVEL CONTROL VALVE
Robert A. Whitlock, Rockford, Ill., assignor to Aqua Matic Inc., Rockford, Ill., a corporation of Illinois
Filed Feb. 17, 1961, Ser. No. 90,145
18 Claims. (Cl. 137—391)

This invention relates to an apparatus for controlling the flow of liquid to and from a tank and is a continuation-in-part of my copending application Serial No. 721,248, filed March 13, 1958, now abandoned.

The present invention particularly pertains to a water treating apparatus including a regenerant tank and which apparatus is of the type wherein regenerant is withdrawn from the tank through a regenerant conduit during one phase of the regeneration cycle and in which water is thereafter supplied to the tank through the same regenerant conduit during a different phase of the cycle. In such water treatment apparatus, a float controlled valve is generally provided in the regenerant line to shut off flow to the tank during the filling thereof, when the liquid in the tank reaches a preselected upper level, and to shut off flow of regenerant from the tank during the regenerant injection phase of the cycle, to thereby regulate the quantity of regenerant supplied to the treatment apparatus. It is essential to proper operation of the treatment apparatus that the regenerant control valves operate to reliably shut off the flow of water to the tank during refill, to prevent overflowing of the tank, and to also completely shut off the flow of regenerant from the tank, upon the completion of the regenerant injection phase, to prevent the flow of regenerant during the subsequent rinse period. In addition, it is necessary that the valve operate accurately at preselected upper and lower liquid levels in the tank to shut off the flow of fluid to and from the tank, respectively, so as to insure accurate measurement of the quantity of regenerant introduced into the treatment apparatus.

The float controlled valves for regulating the flows through the regenerant conduit have not been entirely satisfactory. Such valves inherently require some moving parts to be disposed in the regenerant tank and in contact with the regenerant therein. In practice, salt deposits and corrosion build-up on these parts and frequently render the valves inoperative after only relatively short periods of operation.

An important object of this invention is to provide an apparatus for controlling the flows of fluid to and from a regenerant tank to maintain preselected upper and lower liquid levels therein and in which the flow control apparatus is located externally of the tank to prevent harmful corrosion and the build-up of salt deposits thereon.

Another object of this invention is to provide an apparatus for controlling the flows of liquid to and from a tank and which is pressure operated in accordance with the liquid level in the tank to cut off the flow of liquid to the tank when the liquid reaches a preselected upper level and which is operative to shut off the flow of liquid from the tank when the liquid level reaches a preselected lower level.

A more particular object of this invention is to provide a valve apparatus including a chamber having a diaphragm or bellows exposed to the fluid pressure therein and a conduit communicating the chamber with the tank below the liquid level therein to apply a pressure on the diaphragm correlative with the liquid level in the tank, together with a passage communicating with the chamber for alternately introducing and withdrawing liquid therefrom and a valve in the passage operative in accordance with the direction of liquid flow therethrough and the position of the diaphragm to shut off flow in one direction through the passage to the tank when the liquid level in the tank reaches an upper position; to open when the flow through the passage is reversed and thereby permit withdrawal of liquid from the tank; to close when the liquid level in the tank reaches a preselected lower level and prevent further withdrawal of liquid from the tank, and to open and permit refilling of the tank.

Further objects of this invention are to provide a pressure operated valve apparatus for controlling the flows of fluid to and from a tank which is readily adjustable to selectively vary the volume of liquid which can be introduced and withdrawn from the tank; which is a simple and economical construction; and which is accurate and reliable in operation.

Still another object of this invention is to provide a diaphragm operated valve for controlling the flow of liquid to and from a tank in accordance with the liquid level in the tank which is so arranged as to prevent leakage from the valve or overflowing of the tank in the event the diaphragm ruptures.

An additional object of this invention is to provide an apparatus for controlling the flow of fluid to and from the tank and which has a pressure operated valve mechanism operated in accordance with the liquid level in the tank to control the flow of liquid to the tank and an improved arrangement for producing a relatively rapid closing action of the pressure operated valve when the liquid level reaches a preselected lower level in the tank to effect reliable and accurate control of the liquid level.

These, together with various ancillary objects and advantages of this invention will be more readily appreciated as the same becomes better understood by reference to the following detailed description when taken in connection with the accompanying drawings wherein:

FIGURE 1 is a diagrammatic view of a water treatment apparatus embodying the present invention and with parts broken away and shown in section to illustrate certain details of construction;

FIG. 2 is an enlarged sectional view through a multiple flow control valve and the pressure responsive regenerant control valve and illustrating the same in the normal service position thereof;

FIG. 3 is an enlarged longitudinal section through the multiple flow control valve and regenerant control valve and illustrating the same during the regenerant injection phase of the regeneration cycle;

FIG. 4 is an enlarged longitudinal section through the regenerant valve and illustrating the same in the position at the completion of the brine injection phase of the regeneration cycle;

FIG. 5 is a fragmentary longitudinal sectional view through the regenerant control valve and illustrating the flow restricting device in the position assumed during the refilling of the tank;

FIG. 6 is an enlarged transverse sectional view taken on the plane 6—6 of FIGURE 3;

FIG. 7 is an enlarged transverse sectional view through the regenerant valve taken on the plane 7—7 of FIG. 3;

FIG. 8 is an enlarged fragmentary transverse sectional view through the brine control valve, taken on the plane 8—8 of FIG. 3.

FIG. 9 is a diagrammatic view of a water treatment apparatus having a modified form of the liquid level control apparatus;

FIG. 10 is a longtitudinal sectional view through the liquid level control apparatus of FIG. 9;

FIG. 11 is a diagrammatic view of a water treatment apparatus having a further modified form of liquid level control apparatus; and FIG. 12 is a longitudinal sectional view through the liquid level control apparatus of FIG. 11.

The water treatment apparatus in general includes a treatment tank 10, a regenerant tank 11, a multiple flow control valve 12 for reversibly controlling the flows of fluid to and from the treatment tank 10, an ejector 13 for drawing regenerant from the tank 11 when fluid flows in one direction through the ejector, and for supplying water to the tank 11 to refill the same, when the direction of flow through the ejector is reversed, and a regenerant control valve 14 for regulating the flows to and from the regenerant tank to maintain preselected upper and lower liquid levels therein.

The multiple flow control valve 12 is arranged to reversibly control the flows of fluid through the treatment tank 10 and is herein illustrated of the type generally disclosed in the patent to Whitlock No. 2,714,897, to which reference is hereby made for a more complete disclosure. In general, the multiple flow control valve includes a body 16 having spaced ports 17 and 18 therein and defining a chamber 19 therebetween. An inlet passage 21 communicates with the chamber 19 for supplying raw water thereto and a valve member 22 is disposed in the chamber and movable between the ports 17 and 18 to selectively control the flow of water from the chamber. The valve also includes an upper chamber 23 which communicates through the upper port 17 with the chamber 19 and a lower chamber 24 which communicates through the lower port 18 with the chamber 19. A raw water outlet passage 25 extends from the upper chamber 23 to the top of the treatment tank 11 and a service conduit 26 communicates with the lower chamber 24.

The ejector also communicates with the lower chamber 24 and includes a nozzle 27, a throat 28 and a regenerant chamber 29 at the junction of the nozzle and throat. An ejector by-pass passage 31 is provided around the ejector and includes a check valve 32 arranged to close when liquid flows through the nozzle 27 and into the throat 28 of the ejector and to open to permit reverse flow past the ejector. The outlet of the nozzle 28 is connected through a conduit 33 to the bottom of the treatment tank, as is clearly shown in FIG. 1. A drain conduit 35 communicates with the upper chamber 23 in the valve and a selectively operable valve 36 is provided in the drain line to control flow therethrough. A head 22a is disposed in the path of liquid flow from the upper chamber 23 to the drain conduit and is connected to the valve member 22 by a stem 22b.

In operation, the valve member 22 is normally in its lowered position shown in FIG. 2 so that raw water entering the passage 21 flows through the upper port 17, raw water outlet conduit 25 to the top of the treatment tank, the treated water flowing from the bottom of the treatment tank through conduit 33, past the check valve 32 and bypass passage 31 to the service conduit 26. Under these conditions, water at substantially line pressure is supplied to the regenerant chamber 29 for passage through the regenerant conduit 38 to the regenerant control valve 14. During regeneration of the treatment tank, the drain valve 36 is opened to pass liquid from the chamber 23 to drain. As a result, the pressure head in the chamber 19, which is in communication with the chamber 23, drops to a valve somewhat below full supply line pressure since it is in communication with the atmosphere through the chamber 23 and the drain passage. The pressure head in the chamber 24, however, remains substantially the same as full supply line pressure for a short interval after opening the drain valve so that the pressure in chamber 24 is at least temporarily higher than the pressure in chamber 19. As a consequence, the valve member is moved upwardly into engagement with the valve port 17. A fluid pressure unbalance also exists on the head 22a, when the drain valve is opened, and this assists in moving the valve member to its raised position against port 17. When the valve member seats against the port 17, pressure in the chamber 19 again builds up to full line pressure so that there is a pressure unbalance on the valve member which maintains the same in its raised position shown in FIGURE 3. Fluid then flows from the chamber 19 through the lower port 18 and through the ejector nozzle 27 into the throat 28 to draw liquid into the regenerant chamber 29 through the regenerant line 38. Under these conditions, the check valve 32 in the ejector by-pass is closed and the mixture of the regenerant and water from the ejector is passed through the conduit 33 to the bottom of the treatment tank. The fluid flows upwardly in the treatment tank and through the upper conduit 25 to the drain conduit 35. When the drain valve is thereafter closed, the flow of fluid from the chamber 23 to drain is terminated and the liquid flowing from the inlet chamber 19, through the lower port 18 and through ejector 13; conduit 33, tank 10 and conduit 25, rapidly builds up the pressure in the chamber 23 to full line pressure. This equalizes the pressure on opposite ends of the valve member 22 and at opposite sides of the head 22a so that the valve member drops to its lower position shown in FIG. 2.

The regenerant control valve 14 is disposed in the regenerant line 38 to control the flows of fluid therethrough to and from the tank 11. In accordance with the present invention, the regenerant control valve is operated in response to the pressure head in the regenerant tank 11 and is arranged to open when liquid flows through the regenerant line 38 to the tank until the liquid level in the tank reaches a preselected upper level at which time the valve closes and remains closed until the direction of flow through the conduit 38 is reversed. At this time, the valve again opens and remains open until the liquid in the regenerant tank reaches a preselected lower level at which time the valve again closes to shut off further flow from the tank. More particularly, the regenerant valve 14 includes a body 41 defining a chamber 42 and a movable wall 43 is affixed to the body and so arranged that one side thereof is exposed to the fluid pressure in the chamber while the other side is exposed to atmospheric pressure. The movable wall 43 is preferably in the form of a diaphragm such as the thin resilient and distensible disk illustrated or the diaphragm may be pre-shaped to form a bellows-type device. The body is conveniently formed from a solid block of material such as plastic having a bore extending into one end thereof and defining the annular side wall 45 and the end wall 46 of the body. The side wall 45 is counterbored adjacent the open end thereof to provide a shoulder 47 against which the periphery of the diaphragm 43 abuts, and a cap 48 is threaded into the counterbore and has a flange 48a thereon engageable with the periphery of the diaphragm to uniformly clamp the same to the valve body. As is apparent, the inner face of the diaphgram 43 is exposed to fluid pressure in the chamber 42 and the outer face of the diaphragm is exposed to atmospheric pressure through a vent opening 49 in the cap 28. A conduit 50 is connected to the valve body in communication with a chamber 42 therein and extends downwardly into the regenerant tank as shown in FIGURE 1 to a point adjacent the bottom thereof so as to maintain the liquid in the chamber 42 at a pressure correlative with the liquid level in the regenerant tank 11. As is apparent, the diaphragm 43 will distend in the chamber 42 in a direction and magnitude correlative with the pressure unbalance between the chamber 42 and atmospheric pressure.

A flow passage is provided for communicating the chamber 42 with the regenerant conduit 38 to admit and withdraw fluid from the chamber through the conduit 38, and a valve mechanism is disposed in the flow passage for selectively controlling the flows of fluid therethrough in accordance with the position of the diaphragm 43 and the direction of liquid flow through the conduit 38. More particularly, the valve body 41 is provided with an internally threaded opening 52 in the end wall 46 thereof and a union 53, preferably formed of plastic, is threaded into the opening 52. A lock nut 54 is provided on the union for selectively locking the same in any preselected adjusted position on the valve body. The union has a reduced diameter outer end portion defining a shoulder 55 therebetween and a valve body extension 56, also preferably formed of plastic, is threaded onto the outer end of the union. A gasket 57 is interposed between the end of the extension 56 and the shoulder 55 to seal the interface therebetween.

A passage extends through the union 53 and valve body extension 56 to communicate the regenerant conduit 38 with the chamber 42 and, as illustrated herein, the union has a bore 58 extending therethrough which communicates at one end with the chamber 42 and at the other end with a chamber 59 formed in the extension 56. An opening 61 is formed in the end of the valve body extension and is threaded at the outer end thereof to receive a fitting 62 which connects the conduit 38 therewith. Spaced valve seats 63 and 64 are formed in the passage and are conveniently provided on the end of the union 53 and on the opposing face of the valve body extension, respectively. A valve member 66 is provided for controlling the flows through the passage and has opposed valve faces 67 and 68 respectively engageable with the seats 63 and 64. For reasons set forth more fully hereinafter, the valve member 66 is arranged so as to be movable in the direction of fluid flow through the passage from the conduit 38 to the regenerant tank 11 into engagement with the seat 63 to shut off flow to the tank and is movable in the opposite direction, that is the direction of fluid flow from the tank, into engagement with the valve seat 64.

A valve operating mechanism is provided for operatively connecting the valve member 66 to the diaphragm 43 to control movement of the valve member in accordance with the fluid pressure applied to the inner side of the diaphragm to cut-off flow to the tank when the liquid level therein reaches a preselected upper level and to cut-off flow from the tank when the liquid therein reaches a preselected lower level. The valve operator includes a stem 71 connected to the valve member 66 and loosely received in the bore 58 in the union. As best shown in FIG. 6, the valve stem 71 has a non-circular cross-section so as to provide a flow passage between the stem and the walls of the bore 58. The other end of the stem engages the diaphragm and, as herein shown, is provided with an enlarged head 72 which is secured thereto by a fastener 73.

As previously described, the brine control valve 14 is mounted in fixed relation to the tank 11 so that the column of liquid in the pipe 50 will produce a preselected pressure head when the liquid level in the tank is at its upper level and a different pressure head when the liquid in the tank is at a preselected lower level. As is apparent, the pressure in the chamber 42 will be either above or below atmospheric pressure dependent upon the position of the control valve with respect to the liquid level in the tank. As shown, the brine control valve is mounted above the tank so as to be disposed at all times above the liquid level in the tank. Consequently, the pressure in the chamber 42 will be below atmospheric pressure even when the liquid reaches the upper level U and the negative pressure head in the chamber 42 increases as the liquid level in the tank goes down to the lower level L.

In order to provide accurate control of the liquid levels, it is necessary to provide a relatively thin flexible diaphragm. To minimize the amount of distention of the diaphragm, particularly in its normal position blocking flow to the regenerant tank, a means is provided for yieldably opposing movement of the diaphragm so that, when the valve member is seated against the seat 63, the diaphragm is substantially undistended or, if distended at all, is preferably distended in a direction opposite to that imposed by the fluid pressure unbalance thereon. This yieldable means may conveniently be in the form of a spring 74, herein shown interposed between the head 72 and the union 53. Alternatively, the valve may be positioned with the stem upright so that the valve member is gravity operated in the desired direction. Thus, the valve 41 could be positioned with the enlarged end facing downwardly. With this arrangement, the weight of the stem 71 and head 72 is effective to urge the valve face 67 toward the seat 63 so that the strength of the spring 74 may be reduced or even eliminated for some applications. Moreover, mounting the valve in an upright position also prevents pocketing of the air in the chambers 42 or 59. Since, in the specific embodiment illustrated, the valve member is mounted above the liquid level in the tank, the pressure in the chamber 42 is below atmospheric pressure and the diaphragm is normally distended to the right as viewed in FIG. 2. The spring 74, however, urges the head 72 against the diaphragm and counteracts the fluid pressure unbalance thereon so that, when the valve member 66 is seated against the seat 63, the diaphragm is distended slightly to the left as viewed in FIG. 2. As the fluid pressure unbalance on the diaphragm 43 is opposed to the pressure applied by the spring 74, the diaphragm 43 will always contact the head 72 so that it is unnecessary to rigidly affix the stem to the diaphragm. As is deemed apparent, if the valve member 14 is mounted below the upper liquid level, the pressure in the chamber 42 would be above atmospheric pressure during the normal service run so that the spring 74 would have to be reversed to yieldably urge the diaphragm in a direction into the chamber 42 and opposite the fluid pressure unbalance thereon.

From the foregoing it is apparent that liquid flows through the regenerant conduit 38, through the opening 61 and chamber 59 in the valve extension and through the bore 58 in the union into the chamber 42 and from there flows through conduit 50 to the regenerant tank and that, during the brining phase of the regeneration cycle, the fluid flows in the reverse direction from the tank to the conduit 38 through the chamber 42. It is essential, however, that the pressure in the chamber closely follows the change in head or liquid level in the regenerant tank and be substantially independent of the pressure 14 in the conduit 38. For this purpose, there is provided a restriction in the passage between the conduit 38 and the chamber 42 and, preferably, the flow restriction is located between the valve seat 64 and the conduit 38. As shown in FIGS. 2–4, the passage 61 has a transverse partition 81 therein having a reduced diameter orifice 82 extending therethrough. As best shown in FIG. 7, the orifice is non-circular in cross-section and is so arranged as to provide a restricted by-pass 82a when a ball-type check valve 83 is seated against the partition 81. The ball-type check valve is arranged to seat against the partition during flow of fluid from the regenerant conduit 38 into the tank 11. The orifice 82 has a flow area appreciably smaller than the conduit 50 and provides a restriction to flow into and out of the chamber 42 through conduit 38 which is high as compared to the restriction to flow into and out of the chamber 42 through conduit 50 so that the pressure in the chamber 42 closely follows the change in liquid level in the tank. A guard member 86, best shown in FIG. 8, is provided in the passage 64 to prevent passage of the ball through the conduit 38.

When the brine control valve 14 is initially placed in service, the chamber 42 will contain air and the pressure therein will not correspond to the liquid level in the tank 11. The spring 74 will therefore move the valve member 66 against seat 63 and block flow to the tank. In order to facilitate placing the valve in operation, a plunger 92 is provided for manually moving the valve member to its open position until the water flowing from conduit 38 to the tank 11 has purged all the air from chamber 42.

The operation of the device is as follows. The salt is placed in the regenerant tank 11 and is preferably supported on a grid 90 therein which is spaced above the bottom of the regenerant tank. In the normal service position of the multiple flow control valve 12, the valve member 22 is in its lowered position so that the raw water flows from the inlet conduit 21 through the upper port 17, conduit 25 to the top of the treatment tank and from the bottom of the treatment tank the fluid flows through conduit 33 past check valve 32 and by-pass 31 to service. Under these conditions, the ejector chamber 29 is at substantially line pressure so that liquid is forced through conduit 38 to the regenerant control valve 14.

If the liquid level in the tank 11 is below the upper level designated U in FIG. 1, the pressure in the chamber 42 is below atmospheric pressure by an amount sufficient to move the valve member 66 away from the seat 63 so that liquid flows from the conduit 38 through the restricting orifice 82 and passage 61 and through the bore 58 into the chamber 42 and from there it flows through conduit 50 to the regenerant tank 11. As the liquid level in the tank rises to the upper level designated U, the negative pressure in the chamber 42 decreases whereby the spring 74 is effective to move the valve member 66 against the seat 63. When the valve member seats against the seat 63, the flow from the chamber 59 into the bore 58 is interrupted whereby the pressure builds up in the chamber 59 to substantially the same pressure as exists in the conduit 38. This produces a pressure unbalance on the valve member 66 which retains the same in seated position.

During regeneration, the drain valve 36 is opened and causes the valve member 22 to move to its raised position shown in FIG. 3. This reverses the direction of flow through the treatment tank, the liquid flowing from the inlet 21 through the lower port 18, ejector nozzle 27 into the throat 28 and from the throat through conduit 33 to the bottom of the treatment tank, the effluent from the top of the treatment tank flowing through conduit 25 to drain. When the liquid flows through the ejector 13, the ejector draws liquid through the regenerant conduit 38 and reduces the pressure in the chamber 59 to a value below that in the chamber 42 whereupon the valve member 66 moves away from the seat 63 sufficient to permit liquid to flow past the valve member into the regenerant conduit 38. Liquid is thus drawn from the tank 11 and, as the liquid level in the tank is lowered, the negative pressure head in the chamber 42 increases. This causes the diaphragm to move to the right, as shown in FIGURE 3, so that the valve member 66 gradually moves towards the seat 64, as the liquid level in the tank moves downwardly to the lower liquid level designated L. When the liquid in the tank reaches the lower level L, the pressure unbalance on the diaphragm is sufficient to compress the spring 74 and move the valve member against the seat 64, thereby shutting off further flow of liquid from the brine tank. Since the suction produced by the ejector is greater than the negative pressure head in the chamber 42, it is apparent that there is a pressure unbalance on the valve member 66 while the ejector is in operation, which urges the valve member against the seat 64.

When the drain valve closes in the multiple flow control valve, pressure builds up in the treatment tank and the flow through the ejector is reversed so that fluid under substantially line pressure is supplied to the conduit 38. This forces the valve member away from its seat whereupon the regenerant tank is filled in the manner previously described. As will be noted, when the valve member 14 is located above the upper liquid level in the tank 11, the pressure in the chamber 42 is at all times below atmospheric pressure. Thus, if the diagram 43 ruptures, no fluid will leak from the valve chamber onto the surrounding floor. Moreover, if the diaphragm fails, the spring will move the valve member to a position blocking flow into the tank and thereby prevent overflowing. With this arrangement, the valve will "fail-safe" if the diaphragm ruptures and prevent leakage of water or brine from the system.

It will also be noted that the regenerant valve 14 can be economically formed since the valve body 41, the cap 48, the union 53 and extension 56 are all screw machine parts which can be economically manufactured and assembled.

Moreover, the specific construction, wherein the extension 56 is threaded on the union carried by the main valve body, enables easy and accurate adjustment of the spacing between the seats 63 and 64 to vary the "draw-down" in the regenerant tank.

A modified form of water treatment apparatus is illustrated in FIGS. 9 and 10. The main control valve 12, ejector 13 and liquid level control valve 14 have the same construction as that shown in FIGS. 1-8 and like numerals are used to designate corresponding parts. In this embodiment provision is made for assuring precise termination of withdrawal from the tank when the liquid reaches a preselected lower level. For this purpose, the conduit 50' leading from the chamber 42 to the brine tank is arranged to communicate with the regenerant tank at the desired lower liquid level L therein so as to preclude the drawing of further liquid when the level drops to that point. In order to avoid drawing air when the liquid level drops to the level L, a float-type air-check valve 95 is provided at the inlet end of the conduit 50'. As best shown in FIG. 10, the valve 95 includes a valve body having a port 96 in the upper side thereof and a passage 97 extending between the port 96 and the conduit 50'. A float valve member, herein shown in the form of a buoyant ball 98, is mounted in a perforate cage 99 for movement into and out of position blocking flow through the port 96. When the liquid in the tank 11 is above the level L, the float valve member 98 is buoyed upwardly away from the port 96. When the liquid level drops below the upper end of the cage 99, the float member moves downwardly and, when the liquid level drops to adjacent the level of the port 96, the float valve member 98 seats and blocks the flow of air into the conduit 50' and valve 14. Just before the float member 98 seats, the pressure in the chamber 42 is determined by the difference in liquid head between valve 14 and the liquid level in the tank 11. When the float valve member 98 seats and terminates flow from the regenerant tank, the pressure in the control valve chamber 42 decreases rapidly due to the sub-atmospheric pressure produced by the ejector 13. At that time, the atmospheric pressure on the outer side of the diaphragm 43 operates to rapidly move the valve member to the right as viewed in FIG. 10 until the valve face 68 engages the seat 64. The float valve member thus prevents drawing of air and also functions to cause a rapid reduction in pressure in the chamber 42 which provides rapid closing of the valve face 68 against seat 64. In order to prevent premature closing of the valve 14 during withdrawal from the tank 11, that is before the liquid level falls to the level of the port 96 in the valve 95, the valve 14 is adjusted so that the diaphragm operates to close the valve face 68 against the port 64 only when the pressure in the chamber 42 is somewhat below the pressure which would be produced therein by the difference in liquid head between valve 14 and the port 96 of valve 95. With this arrangement, the decreasing pressure in chamber 42, due to the decreasing head of liquid in the regenerant tank, does not operate the diaphragm to move the valve face 68 against the seat 14 until after the float member 98 terminates flow from the regenerant tank. The closing of valve face 68 against seat 64 thus functions as a safety valve and, in addition, prevents the diaphragm from being subjected to full ejector suction pressure to thereby prevent excessive distention of the diaphragm. As is apparent, the valve face 68 and seat 64 are not absolutely essential and can be omitted if it is desired to rely only on the float valve member 98 to terminate withdrawal from the regenerant tank. The float valve 95 is segregated from the solid regenerant in the tank by a partition tube 90' having an inlet opening adjacent the lower end of the tank.

FIGS. 11 and 12 illustrate a further modified arrangement for providing precise termination of flow from the tank when the liquid reaches a desired lower level. In this embodiment, the liquid level control valve designated 14″ has the same construction as shown in FIGS. 1–8, and in FIGS. 9 and 10, except that a spring 74″ is interposed between the cap 48″ and the diaphragm 43 to normally urge the valve member 66 away from seat 63 and toward seat 64. The control valve 14″ is otherwise the same as in previous embodiments and like numerals designate corresponding parts. In the embodiment of FIGS. 11 and 12, the control valve 14″ is located below the desired lower liquid level L and is connected to the regenerant tank 11″ through a conduit 50″ and to the ejector through a pipe 38″. The end of the conduit 50″ is disposed at the desired lower liquid level L in the tank and a baffle 90″ having an opening adjacent its lower end, is disposed in the tank to prevent the solid regenerant in the tank from entering the pipe 50″. Since the valve 14″ is located below the lower liquid level L in the regenerant tank, the pressure in the chamber 42, due to the head of liquid in the tank, will normally be above atmospheric pressure. As the liquid level drops down from the upper level U to the lower level L, the pressure in the chamber 42 decreases and the spring 74″ gradually moves the diaphragm and valve member to the right. The position of the seat 64 and the force of the spring 74″ is selected so that the valve face 68 does not engage seat 66 until the pressure in chamber 42 drops to a value somewhat below the pressure produced by the difference in the liquid head between the inlet 50″ and the valve 14″. Therefore, the valve face 68 does not engage the seat 64 before the liquid level drops to the inlet of conduit 50″. However, as soon as the liquid level does drop below the inlet of conduit 50″, air is drawn into the valve chamber 42 from the regenerant tank and the pressure in the chamber 42 rapidly decreases to atmospheric pressure. The fluid pressures on opposite sides of the diaphragm are then substantially equalized and the spring operates to move the valve face 68 against the seat to terminate the flow to the pipe 38″. As is apparent, the valve face 68 and the seat 64 in the valve 14″ could also be omitted. In that event, air would be drawn into the ejector 13 after the liquid drops below the lower level L.

During refill of the regenerant tank 11, the valves 14 and 14″ of FIGS. 9 and 10 and FIGS. 11 and 12, respectively, operate in the same general manner as described in connection with FIGS. 1–8 to shut off the flow to the tank when the pressure in the chamber 42 increases to a preselected value correlative with the upper liquid level U. While springs 74 and 74″ are provided in the valve 14 and 14″ to normally move the valve member, it is apparent that the valves could be mounted with the axes extending upright and a suitable weight used to provide proper bias for operating the valve members. As in the preceding embodiments, the valve seat 63 can be adjusted relative to the seat 64 to vary the upper liquid level U at which the valve face 67 will engage the seat 63 to terminate flow to the tank.

I claim:

1. In combination with a tank, valve means for controlling the flow of liquid to and from the tank to maintain the liquid level therein between preselected upper and lower levels, said valve means including a diaphragm having one side exposed to atmospheric pressure, a valve member engageable with said diaphragm and movable therewith, conduit means establishing continuous open communication between the other side of said diaphragm and said tank to apply fluid pressure to the diaphragm correlative with the liquid level in the tank whereby to move the diaphragm and valve member from a second position when the liquid in the tank is below a preselected upper level to a first position when the liquid in the tank is at said preselected upper level, a flow passage adapted to have liquid flow in one direction therethrough to fill the tank and to have liquid flow in the other direction therethrough to withdraw liquid from the tank, said passage having a flow area which is small as compared to the flow area of said conduit means whereby to maintain the pressure in said chamber correlative with the liquid level in said tank as liquid flows in said one direction through said passage, means in said passage defining a valve seat, said valve member extending into said passage and having a valve face engageable with said seat when said member is moved in said one direction in said passage to said first position whereby to block flow to the tank when the liquid therein reaches said preselected upper level, said valve member being operable when liquid flows in the other direction through said passage to open and permit liquid to be withdrawn from the tank, means operative when the liquid reaches a preselected lower level in the tank for terminating flow from the tank, and means for selectively supplying liquid above a preselected pressure to the flow passage for flow to the tank and for reducing the pressure at the flow passage below said preselected pressure to withdraw liquid from the tank.

2. In combination with a tank, a valve for controlling the flow of liquid to and from the tank to maintain the liquid level therein between preselected upper and lower levels, said valve including a diaphragm having one side exposed to atmosphere, a valve member engageable with said diaphragm and movable therewith, conduit means for establishing continuous open communication between the other side of said diaphragm and the tank to apply fluid pressure to said other side of the diaphragm correlative with the liquid level in the tank whereby to move the diaphragm and valve member from a first position when the liquid in the tank is at a preselected upper level to a second position when the liquid level in the tank is at a preselected lower level, a flow passage adapted to have liquid flow in one direction therethrough to fill the tank and in the other direction therethrough to withdraw liquid from the tank, said passage having a flow area which is small as compared to the flow area of said conduit means whereby to maintain the pressure in said chamber correlative with the liquid level in said tank as liquid flows through said passage into said tank, means in said passage defining first and second valve seats, said valve member extending into said passage and having a first valve face engageable with said first valve seat when said valve member is moved in said one direction in said passage to said first position whereby to block flow to said tank when the liquid reaches a preselected upper level, said valve member having a second valve face engageable with said second seat when the valve member is moved in the other direction in said passage to said second position whereby to block liquid flow from the tank when the liquid reaches a preselected lower level, and means for selectively supplying liquid at a preselected pressure to said flow passage for flow to the tank and for reducing the pressure at the flow passage before said preselected pressure to withdraw liquid from the tank.

3. The combination of claim 2 including means for adjusting the spacing between said valve seats to control the change in liquid level in the tank required to move said valve member from said first position to said second position.

4. The combination of claim 2 including means for adjusting the position of said first seat relative to said diaphragm to control the upper liquid level in the tank required to move said valve member to said first position.

5. In a base exchange water treatment apparatus the combination of a regenerant tank, a valve for controlling the flow of liquid to and from said tank to maintain the liquid level therein between preselected upper and lower levels, said valve including a body defining a chamber, said chamber including a diaphragm forming one wall thereof and having one side exposed to fluid pressure in the chamber and the other side exposed to atmosphere, conduit means connecting said chamber to said tank below the lower liquid level therein and providing communication therebetween for passing fluid between said chamber and said tank, passage means communicating with said chamber, selectively operable means connected to said passage means for selectively supplying liquid above atmospheric pressure thereto to cause fluid flow in one direction through said passage means to the tank and for reducing the pressure at said passage means below atmospheric pressure to cause liquid flow from said tank and in the other direction through said passage means, said passage means having a flow impedance between said chamber and said selectively operable means which is higher than the flow impedance of said conduit means whereby the pressure in said chamber varies in accordance with the liquid level in said tank, valve seat means in said passage means between said chamber and said selectively operable means, a valve member in said passage means movable in said one direction to a first seated position blocking flow into the tank and movable in said other direction to a second seated position blocking flow from the tank, and means operatively connecting said valve member to said diaphragm for moving said valve member to said first seated position when the liquid level in the tank is at said preselected upper level and to said second seated position when the liquid level in said tank is at said preselected lower level.

6. The combination of claim 5 wherein said valve member is disposed above the upper liquid level in said tank whereby the pressure in said chamber is below atmospheric pressure at all times, and means yieldably urging said valve member in said one direction to effect seating of said valve member on said one of said seats when said liquid reaches said preselected upper level.

7. The combination of claim 5 including means for adjusting the spacing between said valve seats to control the change in liquid level in the tank required to move said valve member from said first position to said second position.

8. In combination with a tank, a valve for controlling the flow of fluid to and from the tank to maintain the liquid level therein between preselected upper and lower levels, said valve member including a valve body positioned above the upper liquid level in the tank and defining a chamber, a thin flexible diaphragm mounted on said body with one side thereof exposed to fluid pressure in the chamber and the other side exposed to atmospheric pressure, conduit means communicating said chamber with said tank below the lower liquid level therein and providing communication therebetween to apply pressure to said one side of said diaphragm correlative with the liquid level in said tank, passage means communicating at one end with said chamber for introducing and withdrawing liquid therefrom, said passage means having a flow area which is small as compared to the flow area of said conduit means whereby to maintain the pressure in said chamber correlative with the liquid level in said tank as liquid is introduced and withdrawn through said passage means, valve seat means in said passage means, a valve member in said passage means movable therein in the direction of liquid flow into the tank to a first seated position blocking flow to the chamber and movable in the direction of liquid flow from the tank to a second seated position blocking flow from the chamber, means yieldably urging said valve member toward said first seated position blocking flow into said chamber through said passage means, means operatively connecting said valve member to said diaphragm for movement thereby from said first seated position when the liquid in the tank is at said preselected upper level in the tank and to said second seated position when the liquid reaches said preselected lower level in said tank, and selectively operable means for supplying liquid at a preselected pressure to said passage means for flow to the tank and for reducing the pressure at said passage means below said preselected pressure to withdraw liquid from the tank.

9. In combination with a tank, a valve for controlling the flow of liquid to and from said tank to maintain the liquid level therein between preselected upper and lower levels, said valve including a valve body positioned above the upper liquid level in the tank and defining a chamber, a thin flexible diaphragm mounted on said body with one side thereof exposed to fluid pressure in the chamber and the other side exposed to atmospheric pressure, conduit means communicating said chamber with said tank below the lower liquid level therein to apply pressure to said one side of said diaphragm correlative with the liquid level in said tank whereby the fluid pressure unbalance on said diaphragm urges the same inwardly of said chamber, passage means communicating at one end with said chamber for introducing and withdrawing liquid therefrom, said passage means having a flow area which is smaller than the flow area of said conduit means whereby to maintain the pressure in said chamber correlative with the liquid level in said tank as liquid is introduced and withdrawn from the chamber through said passage means, valve seat means in said passage means, a valve member in said passage means movable in the direction of liquid flow therethrough into the chamber to a first seated position blocking flow through said passage means into the chamber and movable in the direction of liquid flow out of the chamber to a second seated position blocking flow out of said chamber through said passage means, means operatively connecting said valve member to said diaphragm for movement thereby, said last mentioned means including a rigid member unattached to said diaphragm and arranged to engage a substantial portion of said one side of said diaphragm, means yieldably urging said valve member toward said first seated position blocking flow into said chamber and yieldably urging said rigid member in a direction outwardly of said chamber and against said diaphragm whereby said diaphragm is operative to control movement of said valve member from said first seated position when the liquid in the tank is at said preselected upper level to said second seated position in the tank when the liquid is at said preselected lower level, and selectively operable means for supplying liquid under a preselected pressure to said passage means for flow to the tank and for reducing the pressure at said passage means below said preselected pressure to withdraw liquid from the tank.

10. In a base exchange water treatment apparatus, the combination of a regenerant tank for storing a quantity of regenerant under atmospheric pressure, a regenerant control valve for controlling the flow of fluid to and from said tank to maintain the liquid therein between preselected upper and lower levels, said valve including a valve body defining a chamber, a diaphragm on said body having one side exposed to fluid pressure in said chamber and the other side in communication with atmosphere, a conduit communicating at one end with said chamber and at the other end with said tank to pass liquid between said chamber and said tank and to apply fluid pressure on the diaphragm correlative with the liquid level in the tank, passage means communicating with said chamber, means including an ejector connected to said passage means selectively operable to withdraw liquid therefrom and to supply liquid thereto, said passage means having a flow area which is smaller than the flow area of said conduit whereby the pressure in said chamber varies in accordance with the liquid level in said tank as liquid is supplied and withdrawn from the tank through said passage means, means defining spaced valve seats in said passage means between said ejector and said chamber, a valve member cooperable with said seats and movable toward said chamber to engage one of said seats and block flow to the chamber and movable in the other direction away from said chamber into engagement with the other of said seats to block flow from said chamber, means operatively connecting with said valve member to said diaphragm for movement thereby into engagement with said one seat to block flow to the chamber when the liquid in the tank reaches a preselected upper level and into engagement with the other seat to block flow from said chamber when the liquid in the tank reaches a preselected lower level.

11. The combination of claim 10 wherein the end of said conduit that communicates with said tank is located at said preselected lower level to interrupt liquid flow from the tank when the liquid reaches said preselected lower level.

12. The combination of claim 11 including a float valve in said tank operative to close said conduit means and block flow of air from the tank into the conduit means when said liquid in the tank reaches said preselected lower level.

13. A valve for controlling the flow of fluid to and from a conduit in accordance with the fluid pressure in the conduit comprising, a valve body defining a chamber, a diaphragm mounted on the body and one side thereof exposed to fluid pressure in the chamber and the other side in communication with atmosphere, a conduit having one end thereof communicating with said chamber, passage means communicating at one end with said chamber, means connected to the other end of said passage means for selectively supplying fluid under pressure to the passage means for flow therethrough to the chamber and for reducing the pressure at said passage means to withdraw fluid from said chamber, spaced valve seats in said passage means, a valve member in said passage means movable in the direction of fluid flow to said chamber into engagement with one seat to block flow to the chamber and movable in the direction of fluid flow from the chamber into engagement with the other seat to block flow from the chamber through said passage means, means in said passage means defining a flow restriction which is higher than the flow impedance of said conduit whereby the pressure in said chamber varies in accordance with the fluid pressure in the conduit, and means connecting said valve member to said diaphragm for movement under the control of the diaphragm to a position blocking flow through said one seat when the pressure in the conduit exceeds a preselected upper value to a position blocking flow through said other seat when the pressure in the conduit is below a preselected lower value.

14. A valve for controlling the flow of fluid to and from a conduit in accordance with the fluid pressure in the conduit, comprising a valve body open at one end, a diaphragm overlying the open end of said body and defining a chamber therein, a cap threaded on said body and engaging the periphery of said diaphragm to clamp the same to the body, said cap having a vent opening therein to communicate the side of the diaphragm opposite the chamber to atmosphere, a conduit having one end communicating with the chamber for passing fluid to and from said chamber and for applying pressure to the chamber side of the diaphragm correlative with the pressure in the conduit, a valve body extension threadedly attached to the body at the side opposite the diaphragm, a passage extending through said valve body extension for supplying and withdrawing liquid from said chamber, means connected to said passage for selectively supplying liquid under a preselected pressure thereto for flow to the chamber and for reducing the pressure at said passage to withdraw liquid from said chamber, means in the passage defining a restriction to flow therethrough which is higher than the flow impedance of said conduit whereby the pressure in the chamber varies in accordance with the pressure in the conduit and is substantially independent of the pressure in the passage, means defining spaced valve seats in said passage, a valve member in said passage cooperable with said seats and movable in the direction of fluid flow toward said chamber into engagement with one seat to block flow to the chamber and movable in the direction of fluid flow from the chamber into engagement with the other seat to block flow from the chamber, means connecting said valve member to said diaphragm for movement under the control of the diaphragm from a position blocking flow through said one seat when the pressure in the conduit exceeds a preselected upper value to a position blocking flow through the other of said seats when the pressure in the conduit is below a preselected lower value.

15. In a base exchange water treatment apparatus, the combination of a regenerant tank for storing a quantity of liquid regenerant under atmospheric pressure, a regenerant control valve for controlling the flow of liquid to and from the tank to maintain the liquid level therein between preselected upper and lower levels, said control valve including a casing defining a diaphragm chamber, a diaphragm mounted on the casing at one side of the chamber and having one side exposed to atmosphere, a valve member operatively connected to said diaphragm for movement thereby, conduit means communicating at one end with said diaphragm chamber and at the other end with said tank at said preselected lower level therein to apply fluid pressure to the diaphragm correlative with the liquid level in the tank whereby to move the diaphragm and valve member from a second position when the liquid in the tank is below said preselected upper level to a first position when the liquid in the tank is at said preselected upper level, a flow passage communicating with said diaphragm chamber, means including an ejector connected to said flow passage for selectively supplying fluid thereto under above atmospheric pressure for flow in one direction through the flow passage to the diaphragm chamber to fill the tank and for reducing the pressure at the flow passage below atmospheric pressure to cause fluid to flow in the other direction through the flow passage and thereby withdraw liquid from the tank, said conduit means having a flow impedance that is low as compared to the flow impedance of said flow passage to maintain the pressure in the chamber correlative with the liquid level in the tank as liquid flows in said one direction through the passage, means in said passage defining a valve seat between said chamber and said ejector, said valve member extending into said passage and having a valve face engageable with said seat when the valve member is moved in said one direction in the passage to said first position whereby to block flow to the tank when the liquid therein reaches said predetermined upper level, said valve member being operable when liquid flows in the other direction through said passage to open and permit liquid to be withdrawn from the tank, the flow from the tank being terminated when the liquid in the tank falls to the level of said other end of said conduit means.

16. In a base exchange water treatment apparatus, the combination of a regenerant tank for storing a quantity of liquid regenerant under atmospheric pressure, a regenerant control valve for controlling the flow of fluid to and from the tank to maintain the liquid level therein between preselected upper and lower levels, said control valve including a casing defining a diaphragm chamber, a diaphragm mounted on the casing at one side of the chamber and having one side exposed to atmosphere, a valve member operatively connected to said diaphragm for movement thereby conduit means communicating at one end with said diaphragm chamber and at the other end with said tank at said preselected lower level therein to apply fluid pressure to the diaphragm, correlative with the liquid level in the tank whereby to move the diaphragm and valve member from a second position when the liquid in the tank is below said preselected upper level to a first position when the liquid in the tank is at said preselected upper level, a flow passage communicating with said diaphragm chamber, means including an ejector connected to said flow passage for selectively supplying fluid thereto under atmospheric pressure for flow in one direction through the flow passage to the diaphragm chamber to fill the tank and for reducing the pressure at the flow passage below atmospheric pressure to cause fluid to flow in the other direction through the flow passage and thereby withdraw liquid from the tank, said conduit means having a low flow impedance to maintain the pressure in the chamber correlative with the liquid level in the tank as liquid flows in said one direction through the passage, means in said passage defining a valve seat between said chamber and said ejector, said valve member extending into said passage and having a valve face engageable with said seat when the valve member is moved in said one direction in the passage to said first position whereby to block flow to the tank when the liquid therein reaches said predetermined upper level, said valve member being operable when liquid flows in the other direction through said passage to open and permit liquid to be withdrawn from the tank, and a float-type valve member in said tank operable to close said conduit means when the liquid in the tank reaches said preselected lower level to prevent drawing air from the tank into said conduit means.

17. In a base exchange water treatment apparatus, the combination of a regenerant tank for storing a quantity of regenerant under atmospheric pressure, a regenerant control valve for controlling the flow of liquid to and from said tank to maintain the liquid therein between preselected upper and lower levels, said valve including a valve casing defining a diaphragm chamber, a diaphragm on the casing having one side exposed to the fluid pressure in the chamber and the other side in communication with atmosphere, a conduit communicating at one end with said chamber and at the other end with said tank at said preselected lower level therein to pass liquid between the chamber and the tank and to apply fluid pressure on the diaphragm correlative with the liquid level in the tank, said casing being located below the lower liquid level in the tank whereby to maintain above atmospheric pressure in the diaphragm chamber, passage means communicating with said chamber, means including an ejector connected to said passage means operable to selectively withdraw liquid from the passage means and to supply liquid under pressure thereto, means defining a valve seat in said passage means between said ejector and said chamber, a valve member having a valve face cooperable with said seat and movable in the direction of liquid flow through the passage means toward the chamber to engage said seat and block flow to the chamber, means operatively connecting said valve member to said diaphragm for movement thereby into engagement with said one seat when the pressure in the chamber reaches a preselected upper value correlative with the head of liquid in the tank at said upper level, the flow from the tank through the conduit being terminated when the liquid in the tank falls to the level of said other end of the conduit.

18. The combination of claim 17 including a second valve seat in said passage means, a second valve face on said valve member movable with the valve member in the direction of liquid flow through the passage means away from the chamber to engage said second seat and block flow through the chamber, said diaphragm being operative in response to the decrease in pressure in the chamber produced when the flow of liquid into the conduit is terminated to move said second valve face against said second seat.

References Cited in the file of this patent

UNITED STATES PATENTS

| 1,663,136 | Lewis | Mar. 20, 1928 |
| 1,753,662 | Merler | Apr. 8, 1930 |
| 1,851,927 | McCord | Mar. 29, 1932 |

FOREIGN PATENTS

| 83,571 | Netherlands | Dec. 15, 1956 |

UNITED STATES PATENT OFFICE

CERTIFICATE OF CORRECTION

Patent No. 3,071,150　　　　　　　　　　　　January 1, 1963

Robert A. Whitlock

It is hereby certified that error appears in the above numbered patent requiring correction and that the said Letters Patent should read as corrected below.

Column 10, line 54, for "before" read -- below --; column 14, line 60, after "thereby" insert a comma.

Signed and sealed this 27th day of August 1963.

(SEAL)
Attest:

ERNEST W. SWIDER
Attesting Officer

DAVID L. LADD
Commissioner of Patents